(12) United States Patent
Ferguson et al.

(10) Patent No.: US 7,676,804 B2
(45) Date of Patent: Mar. 9, 2010

(54) SYSTEMS AND METHOD FOR REMOTELY MODIFYING SOFTWARE ON A WORK MACHINE

(75) Inventors: Alan L. Ferguson, Peoria, IL (US); Brian Lane Jenkins, Washington, IL (US); Trent Ray Meiss, Eureka, IL (US); Steven Wayne O'Neal, Bartonville, IL (US); Daniel Craig Wood, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1602 days.

(21) Appl. No.: 10/849,292

(22) Filed: May 20, 2004

(65) Prior Publication Data
US 2005/0262498 A1 Nov. 24, 2005

(51) Int. Cl.
*G06F 9/44* (2006.01)
(52) U.S. Cl. .................. 717/173; 717/168; 717/171; 717/172
(58) Field of Classification Search .......... 717/168–178
See application file for complete search history.

(56) References Cited

U.S. PATENT DOCUMENTS

| | | | |
|---|---|---|---|
| 5,155,847 A | 10/1992 | Kirouac et al. | |
| 5,619,412 A * | 4/1997 | Hapka | 701/36 |
| 5,835,911 A * | 11/1998 | Nakagawa et al. | 707/203 |
| 5,870,610 A | 2/1999 | Beyda | |
| 5,999,741 A | 12/1999 | May et al. | |
| 6,070,012 A | 5/2000 | Eitner et al. | |
| 6,073,214 A | 6/2000 | Fawcett | |
| 6,094,618 A * | 7/2000 | Harada | 701/207 |
| 6,108,598 A * | 8/2000 | Sumitani | 701/29 |
| 6,479,792 B1 | 11/2002 | Beirermann et al. | |
| 6,487,717 B1 * | 11/2002 | Brunemann et al. | 717/173 |
| 6,539,026 B1 * | 3/2003 | Waclawsky | 370/428 |
| 6,631,313 B2 * | 10/2003 | Hayashi et al. | 717/173 |
| 6,654,673 B2 * | 11/2003 | Ferguson et al. | 701/33 |
| 6,681,392 B1 | 1/2004 | Henry et al. | |
| 6,687,587 B2 * | 2/2004 | Kacel | 701/33 |
| 6,873,886 B1 * | 3/2005 | Mullen et al. | 701/2 |
| 7,284,236 B2 * | 10/2007 | Zhou et al. | 717/121 |
| 2002/0092008 A1 | 7/2002 | Kehne et al. | |
| 2003/0005426 A1 | 1/2003 | Scholtens et al. | |
| 2003/0065808 A1 | 4/2003 | Dawson | |
| 2003/0110482 A1 | 6/2003 | Ferguson et al. | |
| 2003/0135858 A1* | 7/2003 | Nemoto | 725/75 |
| 2004/0010786 A1 | 1/2004 | Cool et al. | |
| 2004/0015952 A1 | 1/2004 | Lajoie et al. | |

\* cited by examiner

*Primary Examiner*—Lewis A Bullock, Jr.
*Assistant Examiner*—Jue Wang
(74) *Attorney, Agent, or Firm*—Finnegan, Henderson, Farabow, Garrett & Dunner

(57) ABSTRACT

A method and system are provided to perform a process of wirelessly providing software updates to a target module located in a work machine. In one embodiment, the process includes determining whether a software update condition exists for software stored in the target module and when such a condition does exist, delivering software update data from a remote off-board system to the work machine. Further, the work machine may determine a location of the target module and whether an update delay condition exists. Also, the process may include delivering the software update to the target module if no update delay condition exists, and delaying the delivery of the software update data to the target module if an update delay condition does exist.

19 Claims, 4 Drawing Sheets

SYSTEMS AND METHOD FOR REMOTELY MODIFYING SOFTWARE ON A WORK MACHINE

TECHNICAL FIELD

This disclosure relates generally to software modification environments, and more particularly to systems and methods for remotely modifying software stored on a work machine component.

BACKGROUND

An important feature in modern work machines (e.g., fixed and mobile commercial machines, such as construction machines, fixed engine systems, marine-based machines, etc.) is the on-board network and associated machine control modules. An on-board network includes many different modules connected to various types of communication links. These links may be proprietary and non-proprietary, such as manufacturer-based data links and communication paths based on known industry standards (e.g., J1939, RS232, RP 1210, RS-422, RS-485, MODBUS, CAN, etc.). A machine control module may monitor and/or control one or more components of the work machine. For example, a control module attached to an on-board data link may control the operations of an engine, a coolant system, a display device, transmission components, etc.

To control and manage their respective components, a control module executes software that is stored in a memory device maintained by the control system. The software is generally a flash file and the memory device is typically a field programmable non-volatile memory, or flash memory. The flash file software installed on a control module often includes optional features and enhancements, such as additional monitoring capabilities. These optional features typically must be enabled, usually by manually inputting a code or password in the machine, when that feature is purchased. In many cases, the optional features may not be enabled. To later initiate these features, a technician generally visits the machine to enable the software associated with the new features.

To address these problems, conventional work machine control systems began to incorporate remote software distribution capabilities. One such system is disclosed in U.S. Pat. No. 6,487,717 ("the '717 patent") issued to Brunemann et al. This system uses a wireless communication framework that includes a vehicle, remote central office, and an Internet provider. The central office is configured to send and/or receive data to/from the vehicle through the Internet provider using wireless communications. The vehicle includes a machine controller connected to a microprocessor, which provides stored performance data indirectly to the central office through the provider. Further, the microprocessor may retrieve software upgrades for the machine controller from the Internet provider based on commands received from an operator of the vehicle.

Although the system described in the '717 patent enables a vehicle to receive software upgrades from a remote source, it does so through an Internet provider. Thus, the central office requires the use of an outside source provider and a user. Further, because machines may include multiple hierarchical on-board data links, the system may have problems modifying software for a control module that is located on a sub-level data link.

Methods, systems, and articles of manufacture consistent with certain disclosed embodiments are directed to solving one or more of the problems set forth above.

SUMMARY OF THE INVENTION

A method and system are provided to perform a process of wirelessly providing software updates to a target module located in a work machine. In one embodiment, the process includes determining whether a software update condition exits for software stored in the target module and when such a condition does exist, delivering software update data from a remote off-board system to the work machine. Further, the work machine may determine a location of the target module and whether an update delay condition exists. Also, the process may include delivering the software update to the target module if no update delay condition exists, and delaying the delivery of the software update data to the target module if an update delay condition does exist.

In another embodiment, a system for providing software updates includes an off-board system having a memory for providing software update data associated with a target module over a wireless communication medium. Further, the system includes a work machine, remotely located from the off-board system, for receiving the software update data. The work machine may further include an interface control system connected to a primary data link, a secondary data link, and the target module. The interface control system is configured to receive the software update data, determine the location of the target module, and determine whether an update delay condition exists. Further, the interface control system can either delay a delivery of the software update data to the target module when an update condition exists, or deliver, without delay, the software data to the target module over the secondary data link.

BRIEF DESCRIPTION OF THE DRAWINGS

The accompanying drawings, which are incorporated in and constitute a part of this specification, illustrate several aspects of the disclosure and together with the description, serve to explain the principles of the disclosure. In the drawings.

DETAILED DESCRIPTION

Reference will now be made in detail to the exemplary embodiments illustrated in the accompanying drawings. Wherever possible, the same reference numbers will be used throughout the drawings to refer to the same or like parts.

Figure 1:
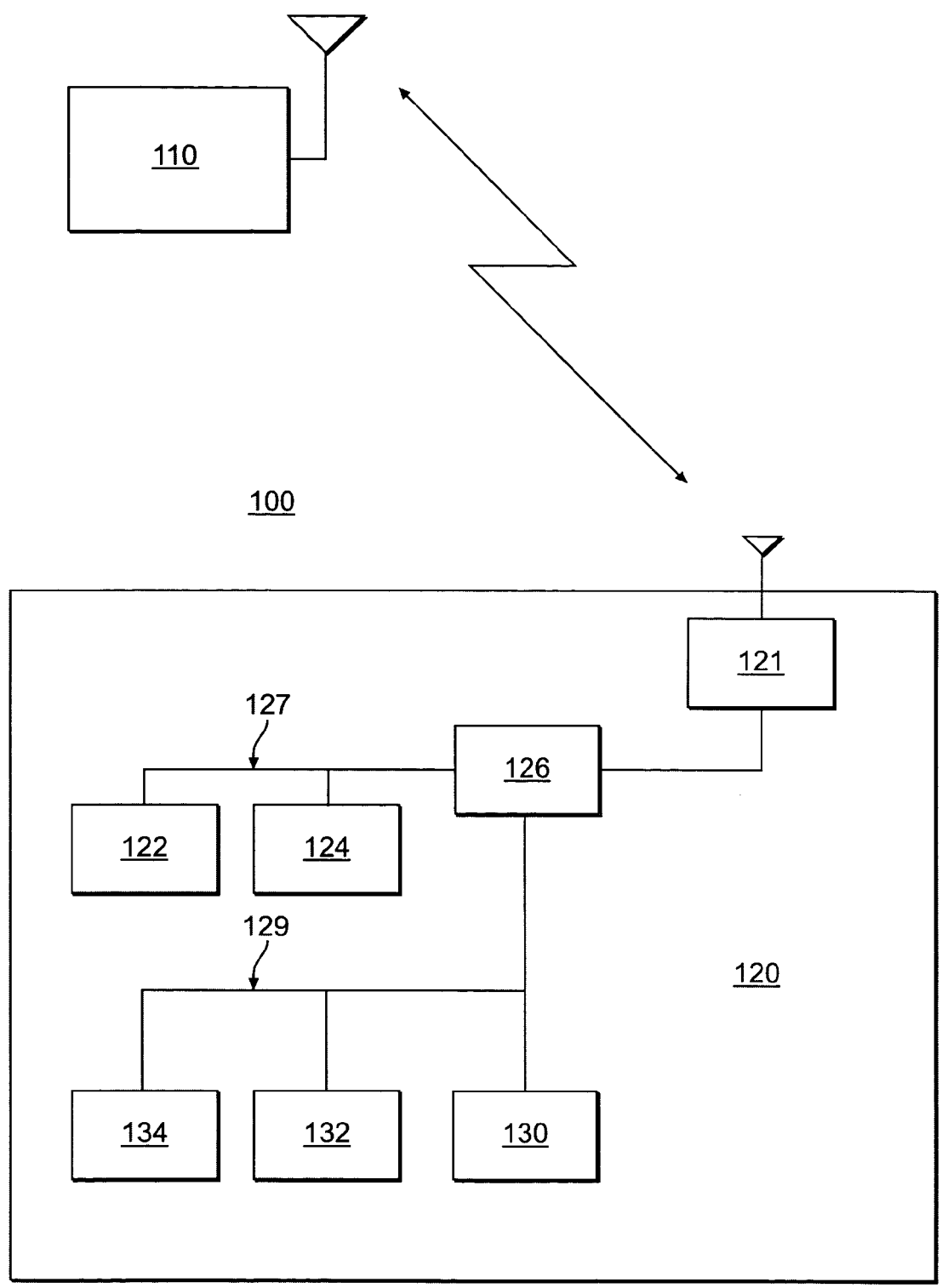
FIG. 1 illustrates a block diagram of an exemplary system that may be configured to perform certain functions consistent with certain disclosed embodiments.

FIG. 1 illustrates an exemplary system 100 in which features and principles consistent with certain disclosed embodiments may be implemented. As shown in FIG. 1, system 100 may include a remote off-board system 110 and a work machine 120 including a communication module 121, an interface control system 126, and on-board modules 122, 124 and 130, 132, 134, respectively connected to primary and secondary on-board data links 127 and 129. Although interface control system 126 is shown as a separate entity, some embodiments may allow control system 126 to be included as a functional component of one or more of on-board modules 122 and 124. Further, although only a specific number of on-board control modules are shown, work machine 120 may include any number of such modules.

Work machine, as the term is used herein, refers to a fixed or mobile machine that performs some type of operation associated with a particular industry, such as mining, construction, farming, etc. and operates between or within work environments (e.g., construction site, mine site, power plants, etc.). A non-limiting example of a fixed machine includes an engine system operating in a plant or off-shore environment (e.g., off-shore drilling platform). Non-limiting examples of mobile machines include commercial machines, such as trucks, cranes, earth moving vehicles, mining vehicles, backhoes, material handling equipment, farming equipment, marine vessels, aircraft, and any type of movable machine that operates in a work environment.

An on-board module, as the term is used herein, may represent any type of component operating in a work machine that controls or is controlled by other components or subcomponents. For example, an on-board module may be an operator display device, an Engine Control Module (ECM), a power system control module, a Global Positioning System (GPS) interface device, an attachment interface that connects one or more sub-components, and any other type of device work machine 120 may use to facilitate operations of the machine during run time or non-run time conditions (i.e., machine engine running or not running, respectively).

An off-board system, as the term is used herein, may represent a system that is located remote from work machine 120. An off-board system may be a system that connects to work machine 120 through wireline or wireless data links. Further, an off-board system may be a computer system including known computing components, such as one or more processors, software, display, and interface devices that operate collectively to perform one or more processes. Alternatively, or additionally, an off-board system may include one or more communications devices that facilitates the transmission of data to and from work machine 120. In certain embodiments, an off-board system may be another work machine remotely located from work machine 120.

Communication module 121 represents one or more devices that is configured to facilitate communications between work machine 120 and an off-board system, such as remote off-board system 110. Communication module 121 may include hardware and/or software that enables the module to send and/or receive data messages through wireline or wireless communications. As shown in FIG. 1, communication module 121 includes one or more wireless antennae for facilitating wireless communications with remote off-board system 110, although other off-board systems may send and receive data messages to and from communication module 121. The wireless communications may include satellite, cellular, infrared, and any other type of wireless communications that enables work machine 120 to wirelessly exchange information with an off-board system.

Interface control system 126 represents an on-board interface device configured to perform functions consistent with embodiments of the work machine. Interface control system 126 may be configured with various types of hardware and software depending on its application within work machine 120. Thus, in accordance with certain embodiments, interface control system 126 may provide interface capability that facilitates the transmission of data to and from communication module 121 and on-board modules 122, 124, 130, 132, and 134. Further, interface control system 126 performs various data processing functions and maintains data for use by one or more on-board modules or off-board systems. For example, interface control system 126 may be configured to perform protocol conversions (e.g., tunneling and translations) and message routing services for on-board data links.

In one embodiment, interface control system 126 may include various computing components used to perform certain functions consistent with the requirements of that embodiment. To do so, interface control system 126 may include one or more processors and memory devices (not shown). For example, interface control system 126 may include a digital core that includes the logic and processing components used by interface control system 126 to perform interface, communications, and software update functionalities. In one embodiment, the digital core may include one or more processors and internal memories. The memories may represent one or more devices that temporarily store data, instructions, and executable code, or any combination thereof, used by a processor. Further, the memories may represent one or more memory devices that store data temporarily during operation of interface control system 126, such as a cache memory, register device, buffer, queuing memory device, and any type of memory device that maintains information. The internal memory used by interface control system 126 may be any type of memory device, such as flash memory, Static Random Access Memory (SRAM), and battery backed non-volatile memory devices.

In operation, the digital core may execute program code to facilitate communications between on-board modules and/or off-board systems. In one embodiment, interface control system 126 may include software that performs protocol conversion operations for converting information associated with one type of data link to another. The conversion operations may include protocol translation and tunneling features.

For clarity of explanation, FIG. 1 depicts interface control system 126 as a distinct element. However, interface control functionality may be implemented via software, hardware, and/or firmware within one or more modules (e.g., 122 and 124) on an on-board data link. Thus, interface control system 126 may, in certain embodiments, represent functionality or logic embedded within another element of work machine 120.

Modules 122 and 124 represent one or more on-board modules connected to a primary data link 127 included in work machine 120. Primary data link may represent a proprietary or non-proprietary data link, such as Society of Automotive Engineers (SAE) standard data links including Controller Area Network (CAN), J1939, etc. Primary data link 127 may be wireless or wireline. For example, in one embodiment, work machine 120 may include wireless sensors that are linked together through interface control system 126. The term "primary data link" is not intended to be limiting. That is, "primary" refers to a data link for designation purposes only, and does not infer primary functionality associated with the data link or any on-board modules connected to the primary data link. However, certain embodiments may arrange on-board modules on specified data links that have different work machine importance in terms of functionality than other on-board modules.

Modules 130, 132, and 134 represent on-board modules connected to a secondary data link 129 within work machine 120. Secondary data link 129 may be a proprietary or non-proprietary data link. Further, secondary data link 129 may be wireless or wired. The term "secondary data link" is not intended to be limiting. That is, "secondary" refers to a data link for designation purposes only, and does not infer secondary functionality associated with the data link or any on-board modules connected to the secondary data link. However, certain embodiments may arrange on-board modules and interface control system 126 on specified data links that have different work machine importance in terms of functionality than other on-board modules.

On-board modules 122, 124, 130, 132, and 134 may include one or more processing devices and memory devices for storing data executed by the processing devices (all not shown). In one embodiment, on-board modules 122, 124, 130, 132, and 134 may include software that is stored in a rewritable memory device, such as a flash memory. The software may be used by a processing device to control a particular component of work machine 120, such as an engine component. In certain embodiments, the software is modifiable through commands received by the processing devices over respective data links 127 and 129.

Remote off-board system 110 represents one or more computing systems associated with a business entity corresponding to work machine 120, such as a manufacturer, dealer, retailer, owner, a department of a business entity (e.g., service center, operations support center, logistics center, etc.), or any other type of entity that generates, maintains, sends, and/or receives information associated with work machine 120. Remote off-board system 110 may include one or more computer systems, such as a workstation, personal digital assistant, laptop, mainframe, etc. Remote off-board system 110 may include Web browser software that requests and receives data from a server when executed by a processor and displays content to a user operating the system. In one embodiment of the disclosure, remote off-board system 110 is connected to work machine 120 through a local wireless communication device and communication module 121. Remote off-board system 110 may also represent one or more portable, or fixed, service systems that perform diagnostics and/or service operations that include receiving and sending messages to work machine 120. For example, remote off-board system 110 may be an electronic testing device that connects to work machine through an RS-232 serial data link or through wireless communication mediums.

Remote off-board system 110 may also communicate with other entities using wireless communications or wireline communications. For example, remote off-board system 110 is configured to generate and send data messages to a work machine entity (not shown) associated with work machine 120, such as an owner or operator of work machine 120. The work machine entity may also access information provided by remote off-board system 110 through wireline or wireless communications. For example, remote off-board system 110 may host or manage a web site that provides information associated with various characteristics, parameters, attributes, etc. of work machine 120 or similar types of work machine. The work machine entity may access the web site through known Internet-related components (e.g., computer executing web browser software) to access and view the work machine information. Additionally, remote off-board system 110 may communicate with the work machine entity through other forms of telephonic and/or electronic communication mediums, such as wireline telephones, pages, text-messages, electronic mail, etc.

In one embodiment, remote off-board system includes one or more databases for storing machine and software data. Machine data may be machine information specific to individual types of work machines, and may include identifier information of specific software stored in the control modules on the machine. Software data may include information related to software that is installed on work machine 120, or any other work machine that may be included in system 100. Software data may include versions of a particular piece of software that are available, software patches, and information detailing which versions of a piece of software are compatible with other software. Further, software data may include information on enhancements or optional features available on particular pieces of software.

Figure 2:
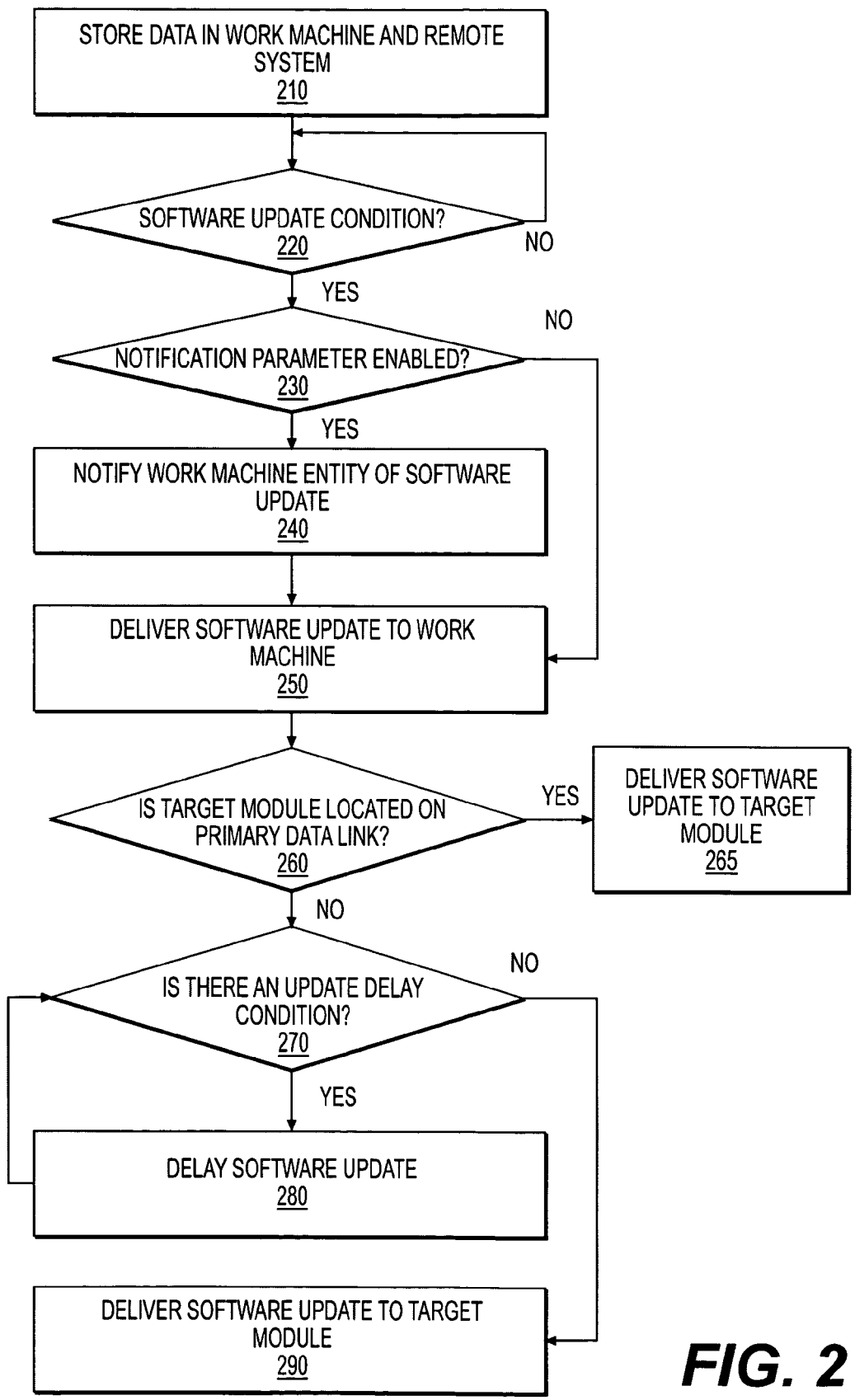
FIG. 2 illustrates a flowchart of an exemplary software update process consistent with certain disclosed embodiments.

In certain embodiments, system 100 is configured to allow one or more on-board modules to receive software data, including software updates, from remote off-board system 110. FIG. 2 illustrates a flowchart of a software update process consistent with exemplary embodiments. At step 210, data is stored in remote off-board system 110 and work machine 120. The data stored may or may not be identical. For instance, remote off-board system 110 may store software data that includes an updated version of software that is stored in an on-board module within work machine 120, such as module 122 or 130. In certain embodiments, work machine 120 may initially have software stored in its on-board modules when they are installed in the machine. Alternatively, software data may be downloaded to one or more of the on-board modules 122, 124, 130, 132, and 134 following their installation via wired or wireless communication techniques.

Once the appropriate data is stored in the respective components, remote off-board system 110 may determine whether a software update condition exists (Step 220). A software update condition represents a condition where off-board system 110 recognizes that one or more on-board modules 122, 124, 130, 132, and 134 may require additional software data, such as an software update to a newer version of executable code, data, parameters, etc. In one embodiment, remote off-board system 110 may recognize a software update condition by accessing its local database to determine whether any new versions of software have been received from other remote sources (i.e., outside vendors, other off-board systems, etc.). Further, system 110 may check a database of information representing the type of software maintained in work machine 120. By comparing appropriate software identifier information, remote off-board system 110 can determine whether any one of on-board modules 122, 124, 130, 132, and 134 require a software update.

Alternatively, or additionally, interface control system 126 may facilitate the designation of a software update condition by collecting software identifier information from on-board modules 122, 124, 130, 132, and 134. Interface control system 126 may store this information in one of its internal memory devices and generate a message for transmission to remote off-board system 110 through communication module 121. Once remote off-board system 110 receives the message, it may parse the data to collect the current software identifier information for on-board control modules 122, 124, 130, 132, and 134. Using this information, remote off-board system 110 may determine whether a software update condition exists. Moreover, a software update condition may be designated manually by a user of either remote off-board system 110 or work machine 120.

Additionally, or alternatively, off-board system 110 may allow a computer process or a user associated with work machine 120 (e.g., operator, owner, dealer, maintenance personnel, etc.) to designate one or more rules to a software update condition. For example, a user may specify geographical boundaries, operators, work machine type identifiers, machine functionality limitations, and any other type of rule that may allow or disallow a software update to take place, thus restricting conditions when a software update condition exists. For instance, a geographical boundary rule may be applied to a software update associated with a particular type of work machine. In this example, off-board system 110 may determine a software update condition exists only if the work machine is within the geographical boundary. Alternatively, or additionally, off-board system 110 may limit software update conditions to situations when a particular user is operating work machine 120. Thus, unless an authorized user is near or operating work machine 120, off-board system 110 may not identify or detect a software update condition. Other applications of software update condition rules may be applied and the disclosed embodiments are not limited to examples described above.

If a software update condition exists (Step 220; YES), remote off-board system 110 may determine whether a notification parameter associated with work machine 120 is enabled (Step 230). This parameter may be used to initiate a notification process from off-board system 110 and may be enabled by a user of remote off-board system 110 or work machine 120. The notification parameter indicates to remote off-board system 110 that a designated user of work machine 120 is to be notified when a software update condition exists. If the parameter is enabled (Step 230; YES), remote off-board system 110 notifies work machine 120 and/or a user associated with work machine 120 of the software update condition (Step 240).

In one embodiment, the notification may be conveyed via an electronic message; however, other notification means may be used. For example, remote off-board system 110 may generate a letter to be delivered to an owner of work machine 120 through the general postal service or an alert delivered to a pager or cell phone. Preferably, the notification would include data detailing the current machine configuration, the updates available on the machine, the criticality of the update, and at least a summary of the issues resolved or enhancements made by the update. Further, the notification, if in electronic form, may include a link to a web site from which the owner may review the proffered update.

In another embodiment, remote off-board system may be optionally configured to allow the owner to accept, delay, or reject the proffered update before its distribution to work machine 120. In such instances, the owner may generate a response, either electronically or by other methods (i.e., a letter, telephone, etc.), indicating the owner's decision regarding the software update. If the owner decides to reject the update, remote off-board system 110 may be configured, through software or manual intervention, to accept or override the owner's decision. If overridden, the software update process continues to Step 250.

At Step 250, remote off-board system 110 delivers the software update to work machine 120. In one embodiment, remote off-board system 110 wirelessly transmits an update message including the software update to communication module 121. Upon receiving the update message, communication module 121 may forward the software update (or the entire message) to interface control system 126.

Once the software update is received, interface control system 126 may perform a update sub-process to identify the target module or modules that are to receive the software update. Once identified, interface control system 126 may also determine what data link is connected to the target module. If the target module is located on primary data link 127 (Step 260; YES), then interface control system 126 delivers the software update to the appropriate target module (Step 265). For example, if on-board module 122 is a target module for the software update, interface control system 126 may format an on-board data link message compatible with the protocol associated with data link 127 and then transmit the message to module 122. Once received, on-board module 122 may execute a process that extracts the software update from the message and stores the information in a local memory for subsequent use and/or execution by module 122.

On the other hand, if interface control system 126 determines that the target module is not located on primary data link 127 (Step 260; NO), it determines whether an update delay condition exists (Step 270). An update delay condition may represent a condition where the target module is not ready to receive an update, interface control system 126 is not ready to send the update, or there is a difference in transmission characteristics (e.g., transmission speeds) for primary data link 127 and secondary data link 129. For example, there may be some circumstances where a target module, such as on-board module 130, is in use and cannot presently process software updates. Interface control system 126 may be aware of such a condition by polling the target module prior to attempting transmission of the software update. Alternatively, on-board modules 130, 132, and 134 may be configured to send status indicators to interface control system 126 reflecting whether the on-board module is in use and cannot accept software updates. Further, in circumstances where characteristics of data links 127 and 129 vary, interface control system 126 may delay transmission of the software update to compensate for any differences in transmission capabilities for secondary data link 129.

If interface control system 126 determines that an update delay condition exists (Step 270; YES), it may delay the transmission of the software update to the target on-board module (Step 280). In this instance, interface control system 126 may store the update in a memory device until the update delay condition ceases to exist. Once the delay condition is no longer present (Step 270; NO), interface control system 126 may deliver the software update to the appropriate target module (Step 290).

Accordingly, interface control system 126 may act as a pass through device that delivers software updates without delay to on-board modules located on secondary data links when an update delay condition does not exist. Further, interface control system 126 may also act as delivery mechanism that delays and controls the transmission of software updates received from off-board system 110 when a update delay condition exists.

The term "delay" as used herein reflects a condition where interface control system 126 or work machine 120 stores information or data, such as a software update, in a memory device that temporarily or permanently maintains the information or data for some prescribed period of time. The term "delay" is not intended to include standard propagation delays that may occur through the use of microprocessor or processing type elements, such as registers, buffers, logic, wires, cable, and other forms of processor components. For example, when interface control system 126 "delays" the delivery of a software update to a target module, system 126 may store the update in a memory device, such as cache memory or similar type of memory location where the information is later retrievable for subsequent delivery when no delay condition exists. Conversely, although interface control system 126 may temporarily store a software update in a memory location (i.e., register or buffer type device) prior to its transmission to a target module, such operations are not intended to be considered as a "delay" in the delivery of the software update when no update delay condition exists.

In another embodiment, work machine 120 may be configured to provide update notifications reflecting either successful or unsuccessful loading of the software update to a target module. For example, interface control system 126 may execute one or more processes that monitor a target module for a notification message following the delivery of a software update to the target module. Each of the on-board modules 122, 124, 130, 132, and 134 may also execute an update process that stores the software update in a memory within the respective module. The update process may generate a notification message when a software update has been received and successfully stored on the memory device within the respective module. Also, on-board modules 122, 124, 130, 132, and 134 may generate a notification message reflecting that the software update was not successfully stored in memory, such as when the update was refused by the respective module (e.g., the software update includes incompatible software for that module), or an event occurs that disrupts the writing of the software update to the respective module.

Interface control system 126 may receive the notification message sent from on-board modules 122, 124, 130, 132, and 134 and forwards the message to off-board system 110 or to another on-board system operating within work machine 120, such as a display component providing status reports to an operator of work machine 120.

Also, interface control system 126 may be configured to execute a process to determine whether the software update received from off-board system 110 is proper and should be forwarded to a target module. If interface control system 126 determines that the software update should not be performed, it may send a notification message to off-board system 110 indicating the unsuccessful delivery of the software update to the target module. When software updates are not successfully performed, the notification messages (whether generated by an on-board module 122, 124, 130, 132, and 134, or interface control system 126) may include data indicating a reason (via codes, flags, or other forms of data) why the software update was not successfully completed.

In another embodiment, interface control system 126 and/or on-board modules 122, 124, 130, 132, and 134 may perform update recovery processes that prevent lock conditions associated with an attempted software update. For example, on-board modules 122, 124, 130, 132, and 134 may perform a process that, prior to storing the software update, stores a copy of the original software (e.g., application, code, data, etc.) included in the on-board module's memory to an alternate memory location or device, such as a RAM area. Once the copy is stored, the on-board module may store the software update in the memory. If the update process determines that the software update is not compatible, or the software update was not successfully stored for any other reason (i.e., faults or failures), the respective on-board module may send a notification message indicating the unsuccessful delivery of the software. Further, the update recovery processes may retrieve the copy of the original software from the alternate memory location and restore it in its previous memory location for subsequent use by the respective on-board module.

Interface control module 126 may receive the notification message indicating unsuccessful delivery of the software update and initiate a retry process to reattempt the storing of the software update to the target module. This retry process may be repeated a predetermined number of times until the delivery of the software update is successful. If the software update is not successfully stored in the target on-board module after the predetermined number of attempts, interface control module 126 may send a notification message to off-board system 110 indicating that the software update was not successfully delivered to the target on-board module.

Additionally, or alternatively, interface control module 126 may also perform a recovery process that retrieves and stores a copy of the original software stored in a target on-board module prior to sending the software update to that module. Upon receiving a notification message (or after receiving a predetermined number of notification messages) from the target on-board module indicating an unsuccessful delivery of the software update, interface control module 126 may push the stored copy of the original software to the target on-board module for reloading and subsequent use by that module.

Thus, using notification messages in a manner consistent with the disclosed embodiments allows work machine 120 to maintain a status of software updates, such as when an update is complete or incomplete. This may be helpful in situations, for example, where incompatible software is provided from off-board system 110 and directed to a target module. The target module or interface control system 126 may perform a compatibility check process to determine whether or not the software update is proper for the intended target module. If the target module, or interface control system 126, determines that the software update is unacceptable, the update process may be aborted and a notification message indicating the unsuccessful writing of the software update in the target module.

Figure 3:
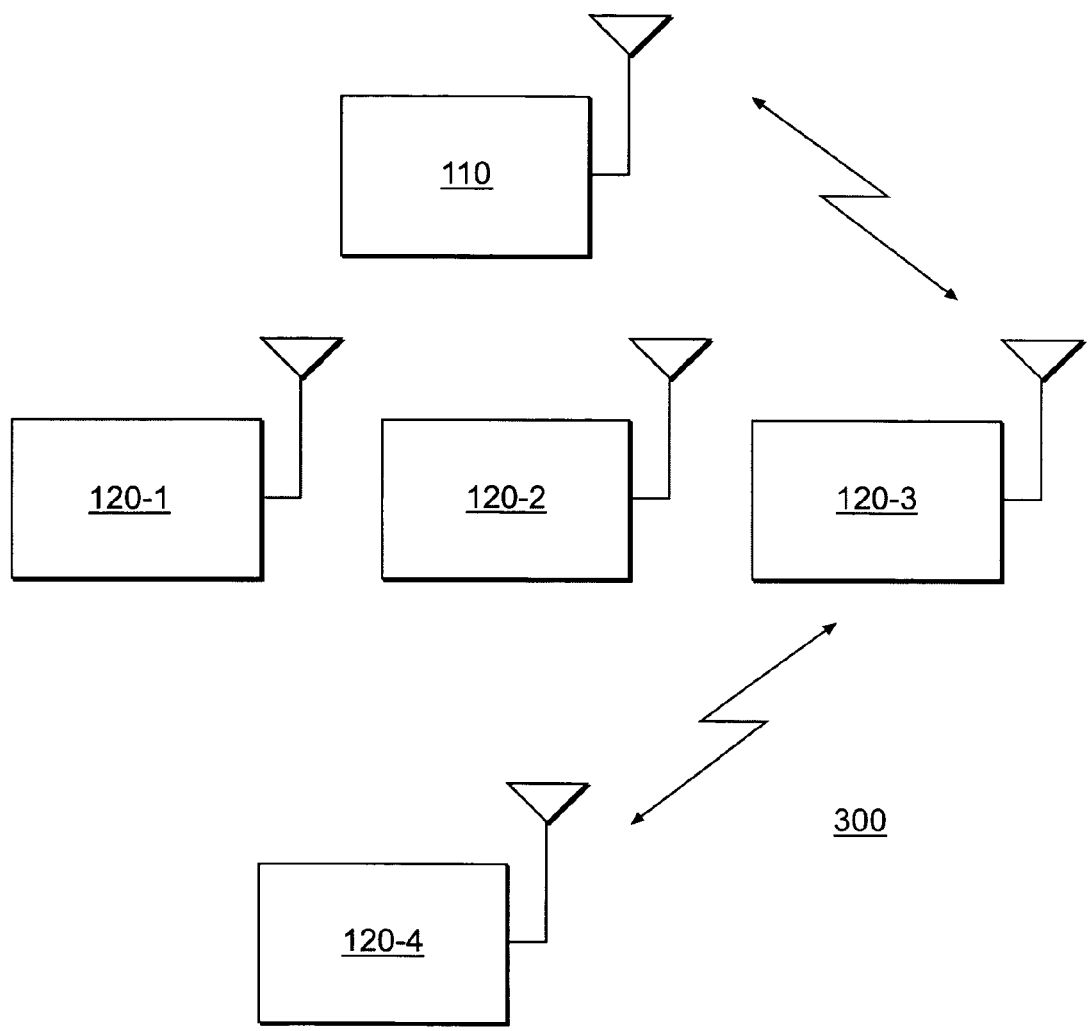
FIG. 3 illustrates a block diagram of an exemplary software update relay environment consistent with certain disclosed embodiments.

In another embodiment, work machine 120 may forward software updates to other work machines that are located within wireless transmission range of each other. FIG. 3 shows a block diagram of a work machine environment 300 associated with this embodiment. As shown, environment 300 includes remote-off-board system 110 and work machines 120-1 to 120-4. The number of work machines depicted in FIG. 3 is exemplary and not intended to be limiting. That is, any number of work machines may be implemented to perform software update relay processes consistent with an exemplary embodiment.

Remote off-board system 110 depicted in FIG. 3 is configured and operates similar to off-board system 110 described above in connection with FIG. 1. Further, work machines 120-1 to 120-4 may be configured and operate similar to work machine 120 described above in connection with FIG. 1. Further, these work machines may or may not be different types of work machines. For example, work machine 120-3 may reflect a hauler type work machine, while machine 120-4 reflects a backhoe type work machine.

Figure 4:
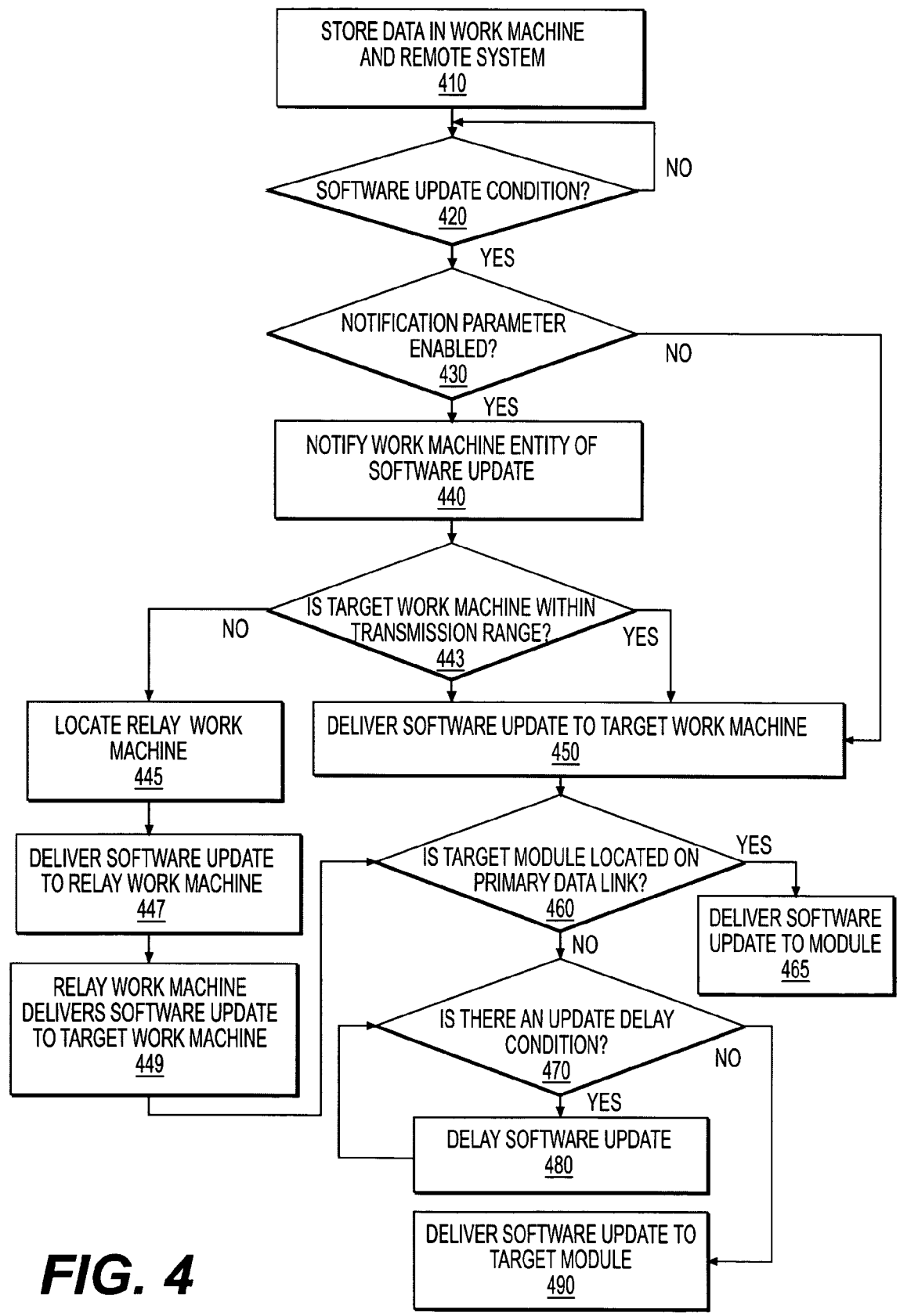
FIG. 4 illustrates a flowchart of an exemplary software update relay process consistent with certain disclosed embodiments.

FIG. 4 shows a flowchart of a software update relay process that may be performed by exemplary methods and systems. Steps 410 through 440 may be performed in a manner similar to those processes described above in connection with Steps 210 through 240 of FIG. 2, except that the target work machine in this example may be work machine 120-4 of environment 300.

At Step 443, remote off-board system 110 may determine whether the target work machine (i.e., machine 120-4) is within transmission range of off-board system's 110 wireless transmission capabilities. If so (Step 443; YES), off-board system 110 delivers the software update to the target work machine (Step 450). From here, the software update relay process performs Steps 450 through 490 in a manner similar to Steps 260 through 290 described above in connection with FIG. 2, except that the target module and interface control system are located in target work machine 120-4.

However, if remote off-board system 110 determines that the target work machine 120-4 is outside its wireless transmission range capabilities, it may locate a relay work machine to assist in the software update process (Step 445). A relay work machine is a machine that is within transmission range of remote off-board system 110 and the target work machine. Further, the relay work machine is configured with interface control system software that is capable of relaying a software update to the target work machine that is within its transmission range. In this example, work machine 120-3 is determined to be a relay work machine because it is within wireless transmission range of work machine 120-4. Such determinations may be performed by the work machines automatically by broadcasting messages to other remote work machines. The work machines that respond to these messages may be identified through unique work machine identifiers that are forwarded back to remote off-board system 110. Additionally, or alternatively, remote off-board system 110 may request any work machines within its communication range to transmit wireless messages to any work machines within their respective wireless transmission ranges to determine whether they are capable of communicating with the target work machine designated by remote off-board system. It is contemplated that other methods may be employed to identify a relay work machine.

Once the relay work machine is located, remote off-board system 110 delivers the software update to the relay work machine (Step 447). Once received, the relay work machine's interface control system may determine that the software update is destined for the target work machine (i.e., machine 120-4). Accordingly, the relay work machine's interface control system may forward the software update message received from remote off-board system 110 to the target work machine through its communication module (Step 449).

Upon the target work machine receiving the software update, it may perform Steps 460 through 490 in a manner consistent with that described above in connection with Steps 260 through 290 of FIG. 2. That is, the target work machine's interface control system identifies the target on-board module that is to receive the software update, and provides the update to that module with or without delay, depending on the presence of an update delay condition.

INDUSTRIAL APPLICABILITY

Methods and systems consistent with exemplary disclosed embodiments allow work machines to receive software updates from a remote off-board system. Because work machines are often employed at remote work sites, it is difficult for a technician to reach the machine to update software on on-board modules. Utilizing the disclosed methods and systems, an off-board system (e.g., remote central office, technician system, etc.) may deliver a software update to a remotely located work machine through various types of wireless communication mediums. The work machine is also configured with an interface control system that determines whether to delay or immediately provide the software update to a target on-board control module. In certain embodiments, the interface control system delays the software update based on an update delay condition. Once the condition is removed, the interface control system delivers the software update to the appropriate target on-board module using appropriate on-board data links connected to the target module. In other embodiments, a work machine may be used by the remote off-board system as a relay machine to forward software updates to a target work machine that is out of transmission range of off-board system, but within transmission range of the relay work machine.

Although embodiments are described with processes that determine whether an update delay condition exists if the target on-board module is located on a secondary data link, alternate embodiments enable the interface control system to delay transmission of a software update to a module located on the primary data link. For example, interface control system 126 may be configured to determine whether an update delay condition exists regardless of whether the target module is located on primary data link 127. Such embodiments are applicable where an on-board module connected to primary data link 127 is in use and cannot presently process software updates issued from interface control system 126.

Further, although the disclosed embodiments are described with a single secondary data link, work machine 120 may be implemented with multiple levels of secondary data links having one or more additional interface control systems, or on-board modules with interface control system functionality. For example, on-board module 130 may include interface control system software and be connected to another secondary data link (not shown) that hosts one or more additional on-board modules. In circumstances where one of the additional on-board modules is a target module, on-board module 130 may receive the software update from interface control system 126 and perform the processes described above in connection with Steps 260-290 of FIG. 2 in order to deliver the software update data to the appropriate target module.

In another embodiment, entities associated with work machine (e.g., operator, owner, dealer, maintenance personnel, etc.) may subscribe to receive a software update from off-board system 110. In this embodiment, the software update may include software that includes features that may not be enabled. The type of software that is disabled may be based on the type of application work machine 120 operates and/or the subscriber designates. For example, different types of work machines may require different types of applications for execution by on-board modules 122, 124, 130, 132, and 134. Accordingly, off-board system 110 may provide a software update that is tailored for these machines. Thus, a software update may include core software that performs a core functionality for the type of work machine hosting on-board modules 122, 124, 130, 132, and 134 that may execute the software update. Also, the software update may include additional software (e.g., sub-code, routines, applications, etc.) that is disabled, but included in the software update provided to work machine 120. For example, the subscriber may pay a business entity affiliated with off-board system 110 a certain amount to obtain the core functionality associated with the update. The subscriber, however, may have the option to purchase any additional functionalities offered by those disabled features in the software update. If the subscriber pays for these additional functions, off-board system 110 may enable the appropriate software in the software update prior to wireless transmitting it to work machine 120. Embodiments are not limited to purchasing additional features offered by a software update. Instead, the subscriber may request that off-board system enable the additional software without having to purchase them from the business entity affiliated with off-board system 110.

Further, work machine 120 may receive a software update with disabled software included in the update. At a later time, the subscriber may purchase (or request without purchasing) any of the additional features offered by some or all of the disabled software. In this instance, off-board system 110 may configure a software update message to update the software previously stored by one or more target on-board modules within work machine 120 related to these additional features. Thus, a software update, as processed by methods and systems related to the disclosed embodiments, may include code, data, etc. that enables one or more disabled software portions included in the previously delivered and stored software update.

Additionally, a software update may include full or partial updates of software stored in on-board modules 122, 124, 130, 132, and 134. Thus, disclosed embodiments are not limited to updating a full or complete file, application, data set, code set, etc. stored in on-board modules 122, 124, 130, 132, and 134. Instead, embodiments may perform partial updates of software stored in these on-board modules.

Also, interface control system 126 may be considered a target module for purposes of receiving software updates from off-board system 110. That is, interface control system may store software that is updateable from off-board system 110 using methods and systems consistent with the disclosed embodiments.

The embodiments, features, aspects, and principles of the disclosed exemplary systems may be implemented in various environments and are not limited to work site environments. For example, a work machine with an embedded gateway may perform the functions described herein in other environments, such as mobile environments between job sites, geographical locations, and settings. Further, the processes disclosed herein are not inherently related to any particular system and may be implemented by a suitable combination of electrical-based components. Embodiments other than those expressly described herein will be apparent to those skilled in the art from consideration of the specification and practice of the disclosed systems. It is intended that the specification and examples be considered as exemplary only, with a true scope of the invention being indicated by the following claims.

What is claimed is:

1. A method for wirelessly providing software updates to a target module located in a machine, comprising:
    determining that a software update condition exists for software stored in the target module, wherein the target module is among a plurality of modules on-board the machine and each module in the plurality of modules is connected to a primary data link or a secondary data link within the machine;
    presenting a user with an indication that an off-board system will update the software stored in the target module;
    receiving a rejection of the software update from the user;
    automatically overriding the user's rejection by performing an update process on the machine, including:
        determining, on the machine, whether the target module is connected to the primary data link or, alternatively, to the secondary data link,
        if it is determined that the target module is connected to the secondary data link, determining whether an update delay condition exists,
        either delaying delivery of the software update to the target module if an update delay condition exists, or delivering the software update to the target module over the secondary data link if no update delay condition exists.

2. The method of claim 1, wherein the update delay condition includes at least one of:
    (i) a condition where the target module is incapable of receiving the software update when the existence of the update delay condition is determined;
    (ii) a condition where the machine includes an interface control system that manages distribution of the software update within the machine and the interface control system is incapable of delivering the software update when the existence of the update delay condition is determined; and
    (iii) a condition where the target module is connected to the secondary data link and the secondary data link has transmission characteristics different from those of the primary data link.

3. The method of claim 1, wherein delivering the software update to the target module if no update delay condition exists includes:
    receiving the software update at an interface control system within the machine, wherein the interface control system manages the delivery of software updates for the machine; and
    forwarding, by the interface control system and without delay, the software update to the target module.

4. The method of claim 1, wherein delaying the delivery of the software update includes:
    receiving the software update at an interface control system within the machine, wherein the interface control system manages the delivery of software updates for the machine;
    storing the software update in a memory device associated with the interface control system; and
    monitoring the update delay condition to determine when to deliver the software update to the target module.

5. The method of claim 1, wherein determining whether an update delay condition exists includes:
    when the target module is in a condition that cannot process the software update, receiving an indication from the target module reflecting the condition.

6. The method of claim 1, wherein the machine includes an interface control system that receives the software update delivered from the off-board system, the secondary data link has a different transmission speed than the primary data link, and the interface control system is connected to the primary data link and the secondary data link, and wherein determining whether an update delay condition exists includes:
    determining whether the target module is located on the secondary data link.

7. The method of claim 1, wherein determining whether a software update condition exists for software stored in the target module includes:
    determining whether the target module is in need of a different version of software based on an identification of software that is currently stored in the target module.

8. The method of claim 1, wherein performing an update process includes:
    providing a notification message from the target module indicating a status of the delivery of the software update to the target module.

9. The method of claim 8, wherein the status of the delivery of the software update reflects either a successful write of the software update to the target module or an unsuccessful write of the software update to the target module.

10. The method of claim 9, wherein when the notification message indicates the unsuccessful write of the software update, the notification message includes data reflecting a reason associated with the unsuccessful write of the software update.

11. A system for providing software updates, comprising:
    an off-board system including a memory for providing a software update over a wireless communication medium;
    a machine, remotely located from the off-board system, for receiving the software update, the machine including:
        an interface control system connected to a primary data link and a secondary data link within the machine, and
        a plurality of modules, wherein a target module is among the plurality of modules and each module in the plurality of modules is connected to the primary data link or the secondary data link within the machine,
    wherein the off-board system is configured to:
        notify a user of the machine that the target module requires a software update,
        receive a rejection from the user regarding the software update, and automatically override the user's rejection by delivering the software update to the machine; and wherein the interface control system is configured to:
receive the software update,
determine, on the machine, whether the target module is connected to the primary data link or, alternatively, to the secondary data link,
if it is determined that the target module is connected to the secondary data link, determine whether an update delay condition exists, and
either delay delivery of the software update to the target module if an update delay condition exists, or deliver the software update to the target module over the secondary data link if no update delay condition exists.

12. The system of claim 11, wherein the update delay condition includes at least one of:
(i) a condition where the target module is incapable of receiving the software update when the existence of the update delay condition is determined;
(ii) a condition where the machine includes an interface control system that manages distribution of the software update within the machine and the interface control system is incapable of delivering the software update when the existence of the update delay condition is determined; and
(iii) a condition where the target module is connected to the secondary data link and the secondary data link has transmission characteristics different from those of the primary data link.

13. The system of claim 11, wherein the interface control system is configured to delay the delivery of the software update if the update delay condition exists by storing the software update in a memory device associated with the interface control system, and monitoring the update delay condition to determine when to deliver the software update to the target module.

14. The system of claim 11, wherein the target module is configured such that, when the target module is in a condition that cannot process the software update, the target module sends an indication to the interface control system reflecting the condition.

15. The system of claim 14, wherein the interface control system uses the indication to determine whether the update delay condition exists.

16. The system of claim 11, wherein the off-board system is configured to determine whether the target module is in need of a new version of software based on an identification of software that is currently stored in the target module.

17. The system of claim 11, wherein the target module is configured to provide a notification message indicating a status of the delivery of the software update to the target module.

18. The system of claim 17, wherein the status of the delivery of the software update reflects either a successful write of the software update to the target module or an unsuccessful write of the software update to the target module.

19. The system of claim 18, wherein when the notification message indicates the unsuccessful write of the software update, the notification message includes data reflecting a reason associated with the unsuccessful write of the software update.

* * * * *